UNITED STATES PATENT OFFICE.

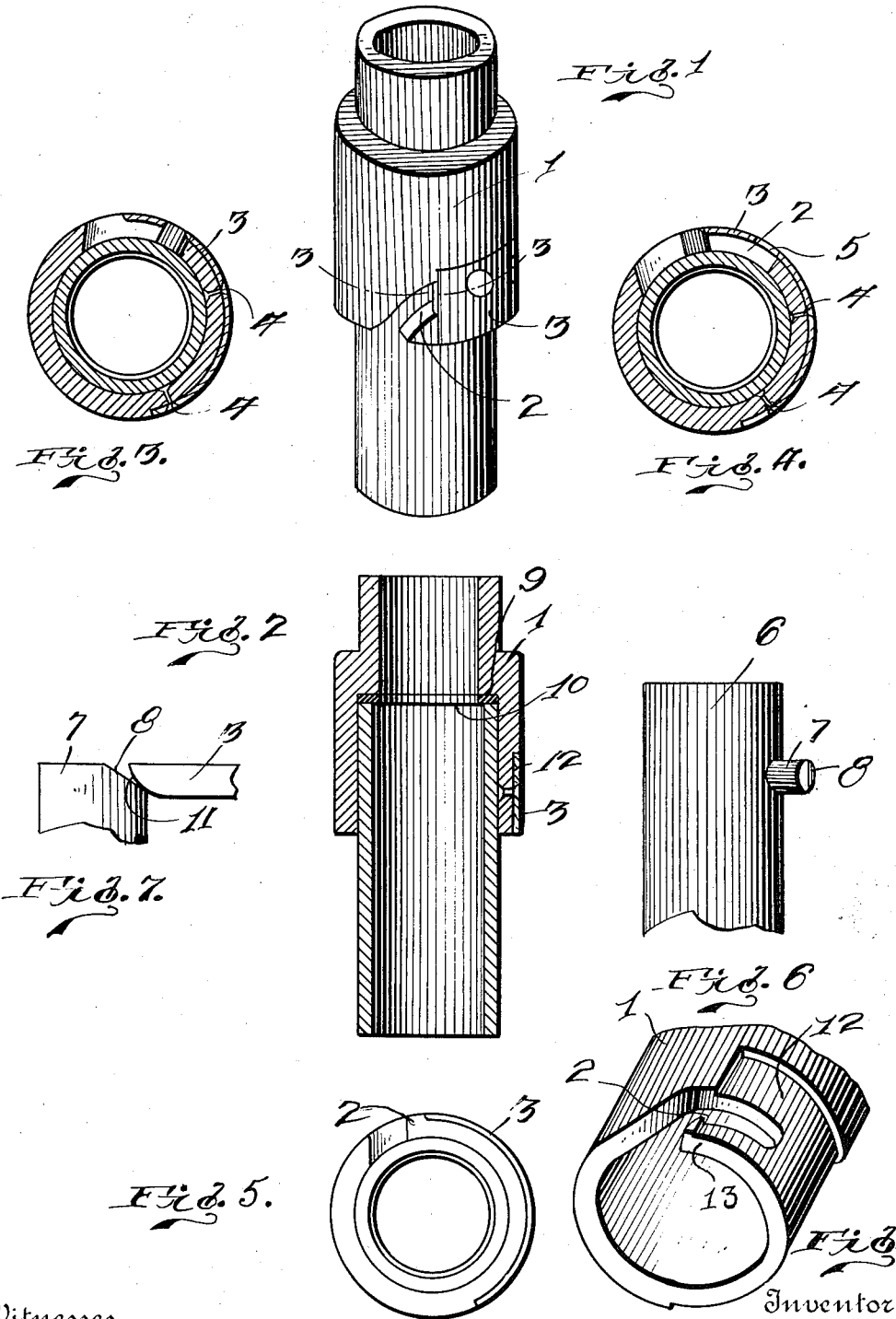

HENRY KELL, OF WORDEN, ILLINOIS, ASSIGNOR OF ONE-HALF TO JOHN F. JOHNSON AND ONE-HALF TO CHARLES W. PIPER, BOTH OF WORDEN, ILLINOIS.

THREADLESS HOSE-COUPLING.

978,029.

Specification of Letters Patent.  Patented Dec. 6, 1910.

Application filed January 11, 1910. Serial No. 537,467.

*To all whom it may concern:*

Be it known that I, HENRY KELL, a citizen of the United States, residing at Worden, in the county of Madison and State of Illinois, have invented certain new and useful Improvements in Threadless Hose-Couplers, of which the following is a specification, reference being had therein to the accompanying drawing.

This invention relates to a detachable coupling for hose, pipe, or the like, and consists principally in the production of novel and efficient means for quickly assembling two sections of a coupling together.

Another object of this invention is the provision of means for firmly securing two sections of a coupling together which will not be likely to become accidentally uncoupled while the hose or pipe is in use either by dragging the same or through the pressure which is passed through the pipe or hose.

With these and other objects in view this invention consists of certain novel constructions, combinations and arrangements of parts as will be hereinafter fully described and claimed.

In the drawings Figure 1 is a perspective view of the coupler showing the sections assembled. Fig. 2 is a longitudinal section of the coupler. Fig. 3 is a transverse section taken on line 3—3 of Fig. 1. Fig. 4 is a transverse section of the coupler showing the sections in an assembled position before the same are locked. Fig. 5 is an end view of the primary section. Fig. 6 is a side elevation of one end of the auxiliary section carrying the locking pin; Fig. 7 is an enlarged view of the locking pin showing the manner in which the locking spring or snap engages the beveled side thereof. Fig. 8 is a perspective view of the primary member showing the spring lip or catch detached therefrom.

Referring to the drawings by numerals 1 designates the primary member which is provided with a curved slot or notch 2. A spring lip or catch 3 is fixedly secured to the primary member 1 by rivets, or any other suitable fastening means, and is provided with an aperture 5 intermediate the ends thereof, and said aperture is positioned near the inner end of the slot 2. The auxiliary member 6 is adapted to fit within the primary member 1 and said auxiliary member 6 is provided upon one side thereof with a laterally extending pin or lug 7. This lug 7 is beveled upon one side as at 8 to allow the spring lip or catch 3 of the primary member to more easily ride over the same and to also allow the pin to more easily engage the aperture 5 for locking the primary and auxiliary sections in assembled position. The primary section 1 is provided upon its inner face intermediate its ends with a shoulder 9, and a washer 10 is adapted to be placed upon said shoulder and said washer is also adapted to be engaged by the inner end of the auxiliary member 6, thereby forming a water tight joint between the primary and auxiliary sections.

It will be readily seen that by having the lug or pin 7 provided with a beveled side, the sections can be readily assembled and held in a locked relation. As soon as the pin 7 engages the aperture 5 formed within the spring lip or catch 3, it will be impossible to detach the sections without first raising the spring lip 3 over the pin 7. After the lip 3 has been raised or detached from the pin 7 the auxiliary section can be rotated within the primary section so as to travel within the slot 2 and can in this manner be freed or separated from the primary section. The free or outer end 11 of the lip 3 is beveled or curved as clearly shown in Fig. 7 so as to allow the pin 7 to readily pass under the spring lip 3 when the sections are being assembled.

The primary member 1 is provided upon its outer surface adjacent to the slot 2 with a notched or cut-out portion 12 which terminates short of the end of the finger 13 and the catch or spring member 3 is adapted to fit within said cut-out portion 12 so as to have the outer face thereof flush with the sides of the primary member 1.

It will be obvious that by having the cut-out portion 12 terminating short of the end of the finger 13, the outer end of the finger 13 will act as a guard or shield for preventing the accidental unlocking of the spring 3 from the pin 7 while the coupling or hose carrying said coupling is being drawn over the ground or moved from place to place.

What I claim is:—

A hose coupling of the class described comprising a primary and an auxiliary section, said primary section provided with a bayonet slot thereby forming a finger near the outer end of said primary section, said primary section provided with a cut-out portion formed upon the outer surface thereof adjacent to said bayonet slot and terminating short of one end of said finger, a spring lip seated in said cut-out portion, and lying flat in said cut-out portion throughout its entire length so as to have the outer face thereof flush with the sides of the primary section, said lip overhanging said bayonet slot and partially closing the same, said auxiliary section provided with a laterally extending pin adapted to travel within said bayonet slot, said lip provided with an aperture registering with said bayonet slot and adapted to receive said laterally extending pin, said pin provided with a beveled side, and said spring lip being beveled upon its under surface near the outer end thereof for facilitating the assembling of the primary and auxiliary sections together.

In testimony whereof I hereunto affix my signature in presence of two witnesses.

HENRY KELL.

Witnesses:
 ED KELL,
 E. D. WURTZ.